Patented Apr. 6, 1948

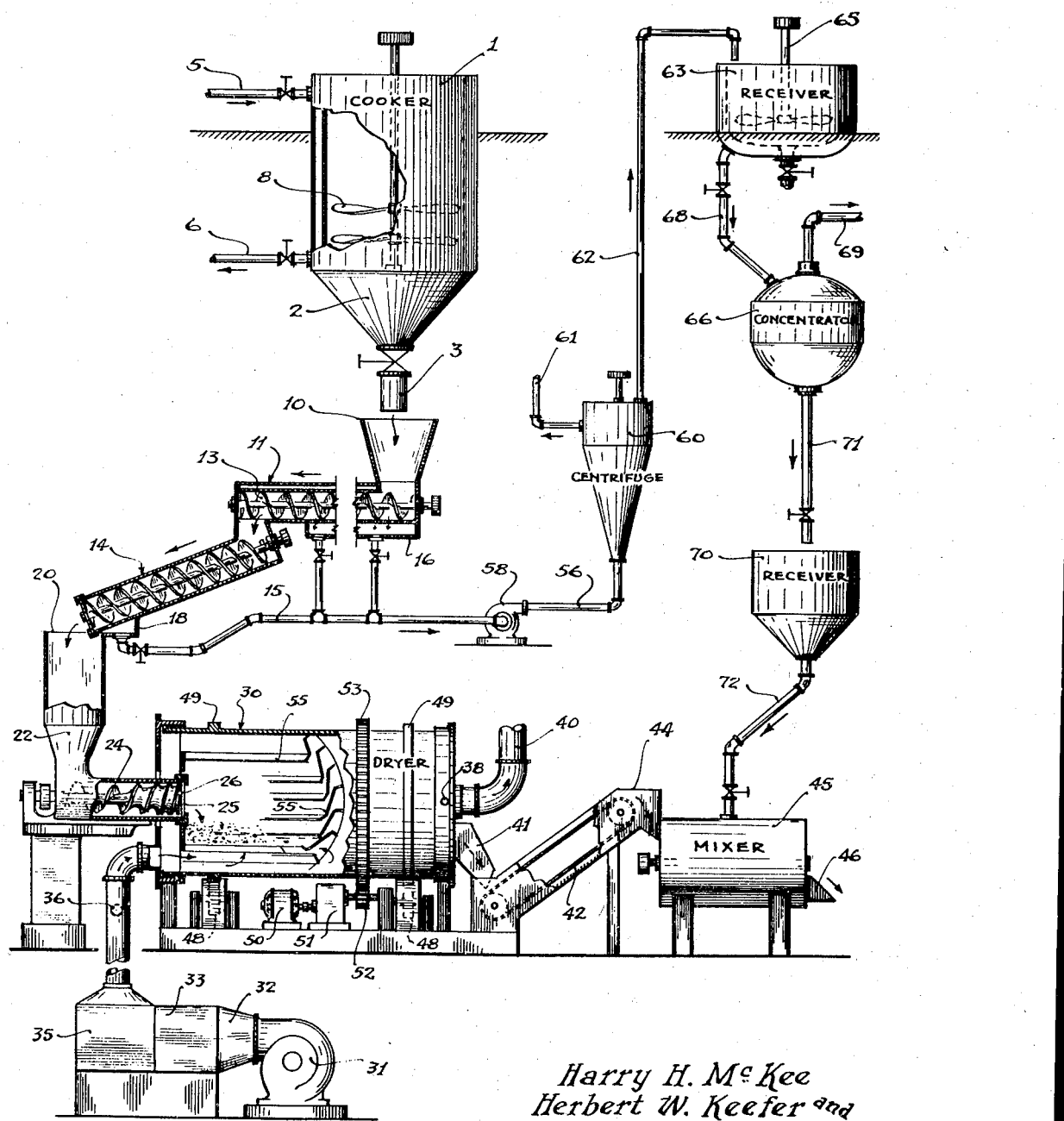

2,439,180

UNITED STATES PATENT OFFICE 2,439,180

METHOD OF PRODUCING DRIED MEAT

Harry H. McKee, Herbert W. Keefer, and William J. McCue, Chicago, Ill., assignors to Industrial Patents Corporation, Chicago, Ill., a corporation of Delaware Application September 26, 1942, Serial No. 459,807

1 Claim. (Cl. 99—208)

This invention relates to the preparation of a meat product and has to do particularly with the preparation of dehydrated meats such as beef, pork, mutton and chicken.

Heretofore, meats have been dehydrated by heating the raw meat while continuously agitated in a steam jacketed revolving dryer until the meat has become cooked and dried to the desired moisture content. Also, raw meats have been cut into small pieces and passed between heated steam jacketed drums whereby the meat is pressed out on the surface of the heated drums and is dehydrated while the drums revolve to a position where a knife-edge tool removes the partially dehydrated meat from the heated surfaces. The meats are then placed in trays on moving belts and the drying operation completed by placing the product in a current of heated air.

The prior methods of dehydrating meat have been unsatisfactory and the products have been objectionable. One of the principal causes for the failure of prior methods has been the use of too high temperatures while the moisture content is lowered. High temperatures impair the color and flavor of the product. Also, meats subjected to high temperatures while undergoing dehydration lose a substantial amount of the vitamin content, particularly during that part of the operation when the moisture content is relatively low. Attempts have been made to cool the meat in the latter stages of the dehydration operation to avoid burning and scorching, but the results have not been satisfactory. Precooking of the meats prior to dehydration by the prior methods has tended to aggravate rather than eliminate the aforesaid difficulties.

An object of the present invention is to produce a dehydrated meat product of improved color, flavor and nutritional value.

Another object of the invention is to prepare a dehydrated meat product of high vitamin content.

Another object of the invention is to manufacture a dehydrated meat product which is sufficiently cooked to permit canning, and which is sufficiently raw to permit further cooking if desired.

A further object of the invention is to provide an improved method of dehydrating meat whereby injurious temperatures are avoided.

Also, an object of the invention is to provide a method of dehydrating meat whereby the juices are more effectively retained in the finished product.

Also, an object of the invention is to utilize more effectively the natural juices of the meat to facilitate cooking.

Other objects of the invention will be observed from the description and claim which follow.

The present invention contemplates broadly subjecting the meat to temperatures sufficiently low to avoid substantial impairment of color, flavor and vitamins, but high enough to produce sufficient cooking to release juices and coagulate the protein; removing a substantial amount of moisture from the precooked product whereby the released juices are at least partially absorbed and the product rendered sufficiently firm so that it can be separated into small particles which will retain their form and facilitate drying; subdividing the partially dehydrated product in relatively small particles; and thereafter continuing the dehydration to produce a product of the desired moisture content.

In accordance with the present invention the meat is first cooked at controlled temperatures so that at no time the heat exceeds a maximum of about 185° F. and preferably does not exceed a temperature of over about 165° F. to 175° F. During the precooking operation approximately 20 per cent to 35 per cent of the moisture is evaporated from the meat and the proteins are coagulated thereby assisting in releasing the moisture and making the meat firm. When the meat has given up approximately one-third of its moisture by weight it has a tendency to reabsorb the remainder of the released free fats and unevaporated moisture. The fats and moisture are substantially completely absorbed in the final stages of the precooking by beef and most other meats. Such reabsorption of fats and moisture is not so noticeable in the case of some meats, such as pork, and in the latter case it is preferable to make an intermediate separation of excess liquids as more fully explained hereinafter.

The partially cooked and dehydrated meat after separation of any excess liquids is subjected to a hashing operation wherein the meat is hashed or comminuted into relatively small particles. The hashed meat is then further dehydrated at temperatures preferably not exceeding 165° F. In the latter operation an additional 65 per cent to 55 per cent of the moisture is removed. The moisture content of the finished product is preferably not in excess of about 10 per cent. Due to the precooking and partial dehydration, the particles of the meat remain in discrete form and are usually free flowing when they are discharged from the final drying operation.

In the case of the treatment of pork and any other meats which may release liquids in excess of that absorbed during the precooking operation, we prefer to separate such juices, further process them if necessary, and re-add them to the final dried product. The juices may first be subjected to separation to remove excess fat such as lard. Also, the aqueous juices are sometimes too dilute to be added to the dehydrated meat, and accordingly, it is desirable to concentrate the juices preferably under vacuum to about 20 per cent to 25 per cent of the original volume by removing about 75 per cent to 80 per cent of the moisture. The concentrate is then added to the dehydrated product in about the same proportion as that originally occurring in the raw product.

When a smoked flavor is desired we may produce a smoked product by our process. It is customary to smoke beef and pork to improve the flavor and to enhance the keeping qualities of the product, and we have found that such smoking may be secured during the dehydrating operation. The addition of the smoke causes an improvement in flavor and imparts a slightly more brown color than straight dried meats. A smoked product may also be produced by smoking the meat in the customary manner, for example as is done in the commercial manufacture of smoked hams, cured and smoked beef, cured and smoked mutton, etc. Such smoked products may be processed according to our invention to produce a smoked, dehydrated meat without the addition of smoke during the dehydrating operation. We prefer to secure the smoking by the addition of smoke during the dehydration. The amount of smoke added during the dehydrating step may vary and will depend on the amount of smoked flavor desired.

The finished product is usually in a granular, free flowing form and may be used as such. The product is particularly suitable for canning. If it is desired to conserve space, the voids may be removed by compressing the product, preferably before charging it to the can. We have found that the granules may be compressed under considerable pressure to produce a substantially cake-like product in which the granules retain their discrete form and may be readily reconverted into loose granules by breaking or crushing.

Seasoning or curing agents, such as salt, nitrite, etc., may be added to the product before or after processing. It is sometimes advantageous to add the reagents to the fresh charge, for example, when it is desired to obtain simultaneous curing and dehydration and/or improvement in color during the processing. Curing agents such as nitrate, nitrite, spices, etc., if any, are ordinarily added to the fresh meat. Salt and ordinary seasoning are preferably added to the finished product. It is also intended that various reagents including those aforesaid, may be added at an intermediate stage of the process, for example, immediately prior to the precooking or the final dehydration step. Preservatives or antioxidants such as gum guaiac may be added to prevent deterioration of certain ingredients of the product including the fats and oils. Such preservatives may advantageously be added to the product prior to contact with the air in the final drying step although they may be added to the fresh charge or to the final product.

The invention will be more fully understood by reference to the accompanying drawing which shows diagrammatically one form of apparatus for carrying out the process of the invention.

Referring to the drawing, the numeral 1 represents a cooking vessel which may be a kettle or tank of any desirable size and shape. As shown, the vessel is a cylindrical vertical tank open at the top and provided with a conical bottom 2 communicating with a valved draw-off pipe 3. The vessel is jacketed and equipped with steam inlet line 5 and steam outlet line 6. The cooker is also provided with an agitator 8. A hopper 10 is disposed below the cooker to receive the product discharged from the cooker by the pipe 3. The hopper is adapted to discharge the contents thereof into a conveyor 11 which contains a screw propeller 13.

One or more conveyors may be used in series and at least one of said conveyors is equipped with means for drawing off liquids separating in the conveyor. Two conveyors 11 and 14 are shown, the latter setting at an incline. The means of separating the liquids may take the form of valved pipes communicating with the conveyors and discharging into a header 15 as shown, or any other suitable means of separating liquids may be used. It is contemplated that the conveyors may be provided with perforations in the bottom which cooperate with drip pans 16 and 18 therebelow to catch the drippings. In order to make provision for closing off the means for separating the liquids when the use of such means is unnecessary, there are shown a series of draw-off lines which may be controlled by opening or closing the valves therein.

The final conveyor 14 communicates with a hopper 20 for transferring the product into a hasher or grinder 22. The discharge end of the conveyor 14 may be restricted or provided with a removable grill or other obstruction whereby more or less back pressure is exerted on the product advanced by the propeller to express juices. As shown, the hasher is the ordinary type of sausage grinder which is provided with a screw propeller 24 and knives 25 cooperating with a perforated plate 26. Any other suitable type of hasher may be used. The hasher is positioned to discharge into one end of a dryer 30. Any well known or preferred type of dryer may be used. We have found a revolving louver type dryer satisfactory.

A blower 31 having a fresh air inlet not shown is connected to the dryer through a tunnel 32 in which is located heating elements 33. A smoke producer 35 is connected to the tunnel 32. The stack of the smoke producer 35 is equipped with a damper 36 which is controlled by a thermostat 38 in the dryer 30.

The dehydrator 30 is provided with an exhaust pipe 40 and a discharge chute 41 which cooperates with a conveyor 42. The conveyor may conveniently be an endless belt with or without means such as buckets or cleats for holding the product. A hopper 44 is located at the discharge end of the conveyor 42 and is arranged to discharge the product therein to a mixer 45. The mixer may be any suitable means for agitating the product so as to obtain uniform mixing of the ingredients therein. The mixer is provided with a discharge device 46. The dryer 30 is arranged to be rotated on rollers 48 and tracks 49 by a motor 50 operating through reduction gears 51 to drive the cog wheel 52 and cooperating gear 53. The interior of the dryer is equipped with longitudinal louvers 55 through which the air from the blower 31 is discharged into the center of the dryer.

The header 15 referred to above is connected with a line 56 in which is located a pump 58.

A centrifuge 60 is connected with the line 56 and is equipped with a line 61 for discharging lighter material and a line 62 for discharging heavier material. The line 62 is adapted to discharge into a tank 63 which is equipped with agitator 65. A concentrator 66 is connected to the lower portion of the tank 63 by a line 68. The concentrator may be any suitable vessel equipped with heating means, such as a steam jacket, and a distillate line 69 preferably attached to a vacuum means not shown. The concentrator discharges into a receiver 70 through a line 71. The receiver 70 in turn is connected to the mixer 45 by a line 72.

In practicing the invention using an apparatus such as that shown in the drawing, the meat is boned and cut into pieces about one to three inches in thickness and charged to the steam jacketed cooker 1. The cooker is ordinarily of sufficient size to hold about 1,000 to 1,500 pounds of meat and is steam jacketed to carry about 3 to 10 pounds of pressure. After the raw meat is placed in the cooker, it is cooked for 20 to 30 minutes at about 10 pounds of steam pressure which produces a temperature of about 240° F. on the inner wall of the kettle. The steam pressure is then reduced to about 3 to 5 pounds which produces a temperature of about 220° F. to 228° F. on the inner wall of the kettle and the cooking is continued for a total period of about 1 to 3 hours. The meat is agitated during the entire cooking operation by a slow moving stirrer or agitator, preferably mechanically driven and located on a shaft in the center of the cooker. The maximum temperature of the meat during the cooking does not exceed 185° F. and preferably is not in excess of about 165° F. to 170° F.

A large percentage of the natural juices of the meat are released during the first 20 to 30 minutes of cooking under the higher steam pressure. At this stage the meat is substantially submerged in the juices, which serves as a cooking medium, thus permitting the meats to withstand higher temperatures than otherwise without impairing the natural flavor and vitamin content. We have found that the use of natural juices according to the invention eliminates the necessity of adding moisture or water and thereby avoids dilution of the juices and produces a product of improved flavor. As the moisture is evaporated and is reabsorbed on continued cooking, the steam pressure is reduced so that the internal meat temperature at the end of the cooking process is not over about 165° F. to 170° F.

During the precooking operation about 20 per cent to 35 per cent of the natural moisture of the fresh meat is evaporated. The meat is partially cooked preferably to the extent that it gives up approximately one-third of the moisture content by weight. For example, if the moisture content of the fresh meat is about 60 per cent to 80 per cent, the moisture content of the precooked product will be about 40 per cent to 55 per cent. In the latter stages of the precooking operation unvaporized natural meat moisture and fats are usually reabsorbed by the meat producing a cooked product substantially free from unabsorbed juices and fats.

At the end of the precooking period the product is discharged from the cooker into the steam jacketed hopper or receiver 10 which feeds into the first of the two steam jacketed conveyors 11 and 14. The lower half of the housing around the screw conveyors is preferably perforated so as to release the meat juices and free fats as the precooked meats are carried forward in the conveyors. Considerable pressure may be exerted on the meat as it is advanced through the conveyor 14 by providing a grill at the discharge end to cause a substantial back pressure by obstructing the flow of the meat. The pressure assists in the expressing of the juices from the meat.

In commercial practice several cookers which discharge into a common receiver may be used. A conveyor, such as conveyor 11, may operate in the lower portion of the receiver to discharge the meat from the receiver into the conveyor 14. The conveyor or conveyors are preferably steam jacketed to maintain the meat at a temperature of about 160° F. to 175° F.

It will be understood that the screw conveyors may be substituted by any other means for transferring the meat from the cooker to the hasher 22. The products may be discharged directly into the hasher from the cooker in case no separation of juices is made or in case it is desired to express juices, any suitable type of press may be used with or without a perforated screw conveyor.

The precooked meat is hashed into relatively small pieces preparatory to drying. The hashing may be done with any suitable type of sausage grinder wherein the meat is cut by knives as it is forced through a perforated plate. Instead of a grinder, we may use a silent cutter type of hasher wherein a rapidly revolving knife cuts the meat as the meat is given a rotary movement in a bowl.

As shown in the drawing, the hasher is a grinder type which is arranged to cooperate with the dryer 30 whereby the hashed meat is extruded through the plate 26 directly into the dryer, the discharge end of the hasher preferably being located inside the dryer. The perforations in the plate may vary in size. For example, holes varying in diameter from about one-sixteenth inch to one-half inch, and preferably about one-eighth inch have been found satisfactory.

We have found that by precooking the meat as described herein that the hashed product will remain in a comminuted form until dried. The finely divided product is broken into fine pieces in the dryer and the dried product assumes the form of granules. The temperature of the product as it enters the dryer is usually about 120° F. to 145° F. and the moisture content is about 45 per cent to 50 per cent. We prefer to use a rotary type dryer containing louvers 55 although any other suitable type of dryer may be used. The ground meat extruded from the grinder falls directly upon the rotating surface of the dryer. As the meat is tumbled on the louvers, it is broken up and contacted with warm air which is forced by the blower 31 through the louvers and through the product. The dryer is usually set at an angle whereby the product gradually progresses toward the discharge end.

The temperature in the dryer varies from about 100° F. to 160° F., the higher temperature being at the discharge end. The temperature is preferably automatically controlled by a thermostat 38 which operates a damper 36. If the temperature tends to become too high, the damper is opened and fresh air admitted, and if the temperature tends to drop unduly, the damper is closed and the proportion of heat increased. By proper correlation of the temperature, air volume, and speed of rotation of the dryer the product will have a moisture content of approximately 10 per cent or less as it is discharged from the dryer. The temperature in the dryer should not be allowed to rise much in excess of about 160° F. to 165° F. in order to avoid impairment of the color, flavor and vitamin content of the product.

In the commercial processing of beef or mutton, the product is discharged from the dryer and samples are taken of each lot of one hour's production. The samples are analyzed for moisture, fat, and salt content. The hourly production lots are then mixed in a mixer so as to obtain the proper fat, moisture and salt content, the desired amount of salt being added during the mixing in case it has not been previously added. Ordinarily about 3½ per cent by weight of salt is required.

All of the fat and juices are usually reabsorbed in the precooking of meats, such as beef and mutton, and consequently it is unnecessary to make any separation of such liquids when processing these products although such a separation may be made if desired. In the dehydrating of certain meats, particularly pork, a large amount of moisture and fat remains unabsorbed in the precooking operation. It is preferable to separate a substantial amount of such fat and moisture before the hashing and final dehydrating operations. The excess unabsorbed liquids usually amount to 20 per cent to 40 per cent based on the original weight of the raw material. Such liquids are advantageously separated after the precooking operation in the screw conveyors 11 and 14 and collected in drip pans or other means. The liquids are transferred to the centrifuge 60 wherein the fat or lard is separated. The lard may be drawn off by the line 61 and processed into prime steam lard. The meat juices may be discharged through the line 62 to a vessel 63 which may be heated by a steam jacket and wherein they are agitated to prevent settling of suspended material. The juices are conducted from the agitator to the concentrator 66.

In the concentrator the juices are usually reduced under subatmospheric pressure to about one-fifth of their original weight, although this is subject to considerable variation. The temperature during the concentrating operation should not exceed about 160° F. in order to avoid loss of color and flavor. The concentrated juices are mixed in the mixer 45 with the proper proportion of the dehydrated meat, salt being added if necessary along with the juices. The entire batch comprising dehydrated meat, concentrated juices, free fat and salt is mixed in the correct proportions to meet any given specifications. The proportions are usually determined by analyzing samples at intervals and the production over a given period, for example two or three hours, mixed according to the amounts indicated by the analysis. Although the juices are ordinarily combined with the dehydrated meat in the mixer, it is contemplated that the juices may be added to the precooked meat charged to the dryer. In the latter case the mixer may or may not be necessary.

As an example of the operation of the invention, a dressed beef carcass after removing all bruised portions of meat, bloodclots, fibrous tissue, excess fat, etc., was boned. The boneless meat contained not in excess of about 8 per cent fat. The boneless meat was cut into about 2 inch to 2½ inch cubes. About 1,500 pounds of the cubed meat was charged to a steam jacketed kettle together with about 1⅓ pounds of salt for each 100 pounds of meat. Steam pressure of about 2 pounds to 5 pounds was turned on and the meat slowly agitated with a stirrer. The meat was cooked until an internal temperature of about 165° F. was reached and the temperature maintained for about thirty minutes. The entire cooking operation required about 1½ to 2 hours.

During the cooking operation moisture was allowed to evaporate. After about 1 hour of cooking considerable free juices were noticeable but toward the end of the cooking period the juices and fats were reabsorbed so that practically no free juices remained in the final product. The shrinkage during the cooking period was about 30 per cent due to the evaporation of moisture. The cooked meat was removed from the jacketed kettle and hashed in a hasher containing a ⅛ inch plate. The temperature of the meat at the time of hashing was about 170° F. to 175° F., the slight increase of temperature resulting from transferring the meat through steam jacketed pipes and conveyors.

The hashed meat was fed directly into a rotary type dryer at the rate of about 450 pounds per hour. The temperature of the meat feeding into the dryer was about 135° F. and the moisture content thereof was about 45 per cent to 50 per cent. The dryer was rotated at a speed of about one-half revolution per minute while heated air was passed therethrough. The temperature of the air at the inlet to the dryer was about 320° F. and at the outlet to the dryer about 150° F. The velocity of the air through the dryer was about 900 cubic feet per minute. The temperature of the air was controlled by a fresh air damper in the air inlet line to the dryer. The operation was carefully controlled so that the temperature of the meat in the dryer at no time exceeded about 160° F. and the temperature was maintained most of the time not in excess of about 150° F.

The product discharged from the dryer was in granular form and showed on analysis moisture 10 per cent, salt 3½ per cent, fat 30 per cent, and protein 56½ per cent. The product was compressed and canned.

As another example of the invention, boneless pork was prepared by boning the dressed hog carcass so as to produce a boned product reasonably free from trimmable fat, bloodclots, fibrous tissue, etc. The head meat, cheek meat, and dark flesh or coarse muscle fiber were also excluded. The lean pork material was cut into cubes of approximately 2 inches to 2½ inches and placed in a jacketed kettle heated by a steam pressure of 2 pounds to 5 pounds. The kettle was equipped with an agitator to cause continuous agitation of the materials during the entire precooking operation. The meats were precooked for about 30 minutes at about 165° F. internal temperature. Approximately 30 per cent of the original weight was evaporated during the precooking period. The precooked meats, together with meat juices and free fat, were discharged from the kettle into a steam jacketed receiver located directly beneath the cooking kettles. The receiver contained a feed screw arrangement and the lower half of the housing around the feed screw was perforated to permit the draining off of meat juices and free fat.

The precooked meat after draining off the juices and fat was transferred to a grinder and ground through a one-eighth inch plate, the grinder discharging directly into a dryer. The temperature of the meat after grinding was approximately 135° F. and the moisture content was approximately 50%. The ground meat was discharged into the dryer at the rate of about 450 pounds per hour. The temperature of the inlet air to the dryer was about 320° F. and the temperature of the exhaust air was about 150° F. The dryer was rotated at a speed of about one-half revolution per minute. The temperature of the inlet air was controlled by means of a damper on the inlet air line and carefully regulated so that the exhaust temperature at no time was in excess of about 150° F.

The meat juices and free fat drawn off from the screw conveyor were discharged into a receiver located below the precooking kettle. The juices were transferred from the receiver into a settling tank and the temperature maintained sufficiently high so that the free fats separated from the aqueous juices. The free fat was drawn off to lard tanks and used for standard lard production. The aqueous meat juices were placed in a steam jacketed tank and concentrated to approximately 40% solids by weight. The concentrated juices and salt were added to the precooked meats discharged from the dryer and the product thoroughly mixed. The finished product showed an analysis of 35% fat, 10% moisture, 3½% salt and 51½% protein. The product was compressed and charged to cans.

Smoked products may be prepared substantially as described in the above examples by mixing smoke to the heated current of air passed through the dryer.

The invention, of course, is not limited to the above examples and is not restricted to the dehydration of pork and beef. The dehydration of mutton is usually similar to the dehydration of beef. However, certain other meat products may require some variations and modifications in the process.

As applied to the dehydration of chicken and other fowls it may be necessary to precook the carcass prior to boning since it is somewhat difficult otherwise to remove the meat from a carcass such as a fowl which contains a large proportion of bones. Also in some instances, particularly in the case of chicken, it may be necessary to separate the different parts of the carcass such as the breast, legs, wings, etc., or to separate the white meat and dark meat, and process them separately. Moreover, in the processing of some meat products it may be impractical or undesirable to evaporate a substantial amount of the moisture during the precooking operation.

The invention is also applicable to the preparation of compounded food products comprising meat as well as other ingredients including cereals and other food products such as vegetables, bone meal, liquid oil, etc. Products of the latter type include animal foods such as dog foods. Mixtures of the foregoing ingredients are ordinarily quite thick and may be admixed with sufficient water to form a relatively thick paste containing for example about 60 per cent moisture. During the precooking of a mixture of such thickness it may be difficult to obtain the required temperature for precooking and evaporating moisture without scorching the product. Therefore it is desirable to use a vacuum during the precooking operation in order to reduce the cooking temperature, and to facilitate the removal of moisture. Also such thick mixtures on hashing may extrude into rods or strips which are so coherent that it is necessary to cut them into small pieces before subjecting them to the final drying operation.

The present invention has the advantage of precooking meats at relatively low temperatures so that the color, flavor, and vitamin content is substantially unaffected. Thus the temperatures are carefully controlled during the process so that at no time is the meat subjected to temperatures above 160° F. for any substantial length of time. Also the precooking operation is controlled as to time and temperature so as to only partially cook the meats thereby leaving sufficient rawness to the meats to permit further cooking of the dehydrated product.

The product does not require refrigeration for storage over reasonable lengths of time. It is appetizing and may be eaten just as it comes from the can. The addition of water restores the meat to the consistency of ground fresh meat and in that form can be served as meat loaf, patties, hash or any other type of dish in which ground meat is used. The product is relatively stable and on the addition of suitable anti-oxidants such as gum guaiac the product can be packaged without the necessity of hermetic sealing. The dehydrated meats so protected from oxidation permit individual quantities to be placed in paper or cloth sacks which in turn can be stored in larger containers as a protection from parasites and moisture.

Obviously, many modifications and variations of the invention hereinbefore set forth may be made without distinguishing from the spirit and scope thereof, and therefore only such limitations should be imposed as are indicated in the appended claim.

We claim:

The process for the manufacture of dehydrated partially cooked meat which comprises subjecting raw meat to a partial cooking operation at a temperature of from approximately 160° F. to 180° F. for about 20 to 30 minutes, cooking the meat at said temperature and for said time period to release the natural juices from the meat and substantially coagulate the proteins, continuing said cooking of the meat in the released juices at a reduced temperature below approximately 160° F. for a period of one to three hours while allowing free evaporation of moisture and to cause the evaporated juices to be reabsorbed in the meat, said evaporation of moisture continuing until the meat has a moisture content of from about 40 to 50 percent, then hashing the product, and then dehydrating said product to have a moisture content not in excess of 10 percent.

HARRY H. McKEE.
HERBERT W. KEEFER.
WILLIAM J. McCUE.

REFERENCES CITED

The following references are of record in the file of this patent:

UNITED STATES PATENTS

| Number | Name | Date |
| --- | --- | --- |
| 798,138 | Maragliano | Aug. 29, 1905 |
| 1,372,527 | MacLachlan | Mar. 22, 1921 |
| 1,382,673 | Remus | June 28, 1921 |
| 1,521,127 | Remus | Dec. 30, 1924 |
| 1,536,308 | Remus | May 5, 1925 |
| 1,899,224 | Abbott | Feb. 28, 1933 |
| 2,278,463 | Musher | Apr. 7, 1942 |
| 2,278,476 | Musher | Apr. 7, 1942 |
| 2,339,757 | Baer | Jan. 25, 1944 |
| 2,340,170 | Baer | Jan. 25, 1944 |